June 25, 1957 R. R. MYERS ET AL 2,796,758
VISCOMETER
Filed Jan. 25, 1955 2 Sheets-Sheet 1
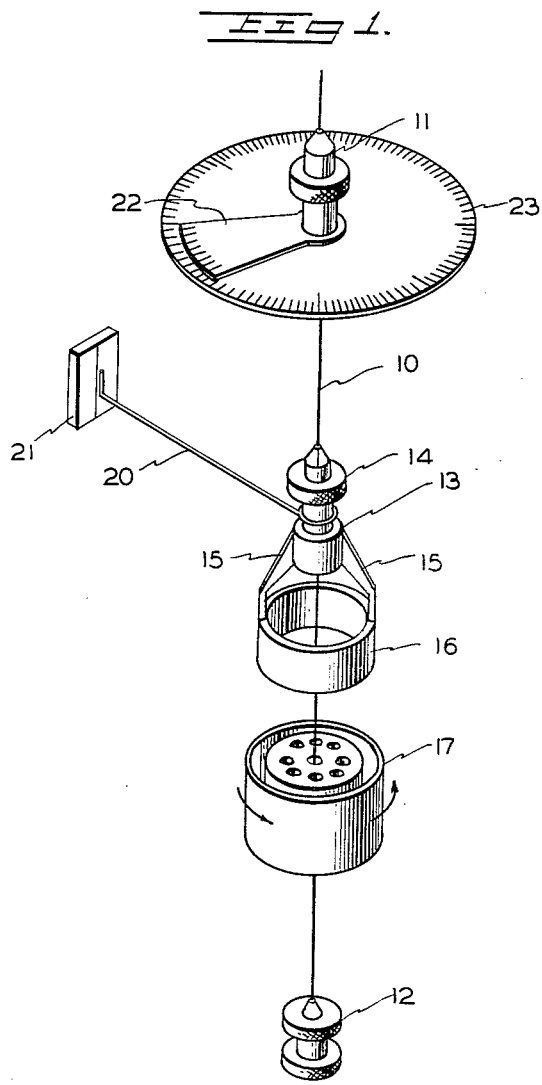
INVENTOR
RAYMOND R. MYERS
ALBERT C. ZETTLEMOYER
BY Adams, Forward & McLean
ATTORNEYS

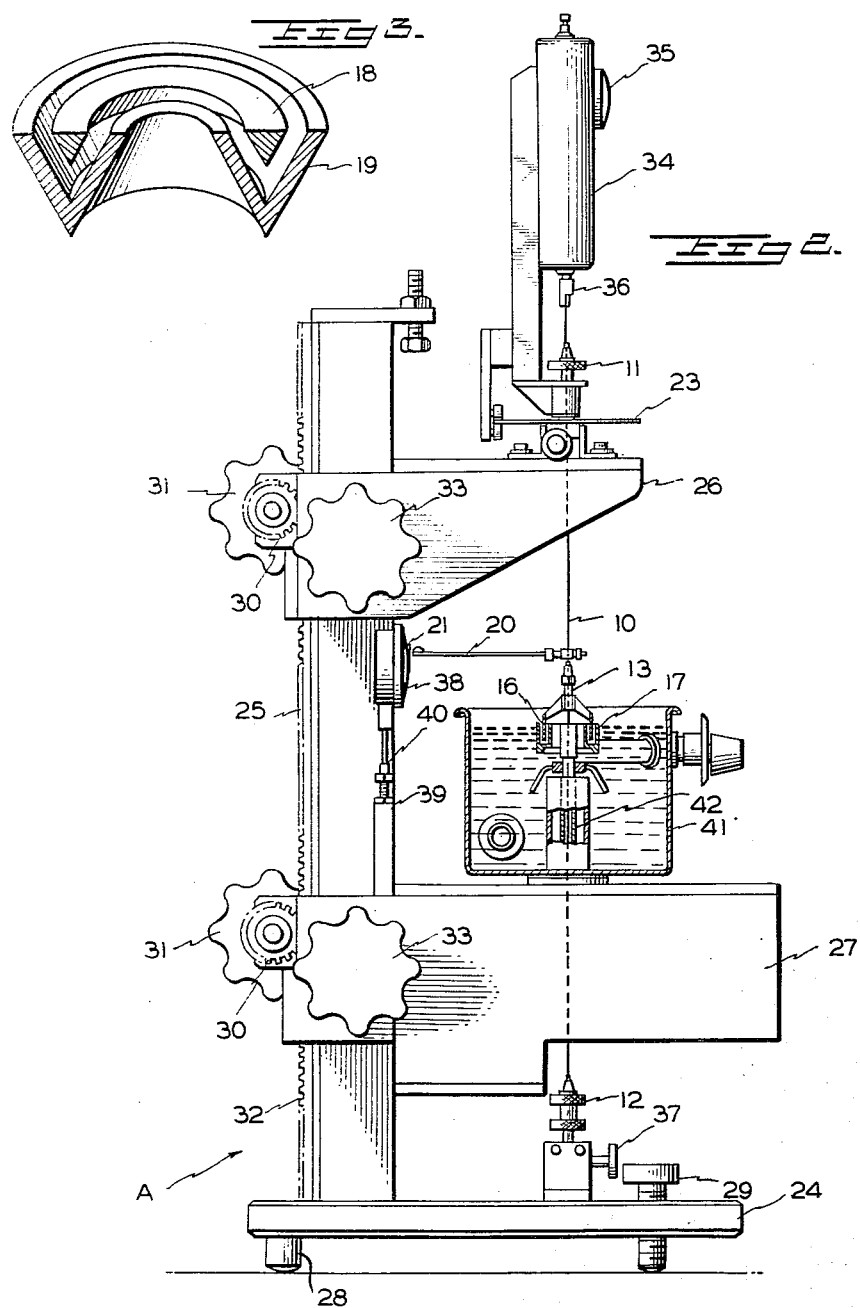

United States Patent Office 2,796,758
Patented June 25, 1957

2,796,758

VISCOMETER

Raymond Reever Myers and Albert Charles Zettlemoyer, Bethlehem, Pa., assignors to Olin Mathieson Chemical Corporation, a corporation of Virginia Application January 25, 1955, Serial No. 484,014

4 Claims. (Cl. 73—60)

This invention relates to apparatus for ascertaining the flow characteristics of liquids and the like, and more particularly to an improved rotational viscometer, embodying a completely frictionless suspension, which is particularly useful for low shear rate rheological study of low viscosity fluids.

One of the problems encountered in the preparation of pharmaceutical dispersions is the tendency of solids to settle and cake in their containing vial. This problem was acute during the early years of manufacture of various oral and injectable preparations, especially when refrigerated storage was necessary in order to maintain a high level of potency, and is of current importance in that the trend toward increased shelf life and higher concentrations of solids emphasizes the necessity of maintaining physical stability in the dispersion. Rheological study of such dispersions, particularly at extremely low shear rates, is useful as an aid to understanding the caking tendencies of these dispersions. Conventional viscometers such as the Garrison type which is useful for determining the viscosity of highly viscous drilling muds, and those having a bearing type suspension, generally, do not have the sensitivity necessary for obtaining low shear rate data for such low viscosity fluids as pharmaceutical dispersions. We have devised a highly sensitive rotational viscometer with which the flow characteristics of low viscosity fluids can be studied at extremely low rates of shear, for example, at shear rates in the order of $10^{-1}$ seconds. Thus, our instrument is particularly useful for studying the caking tendencies of pharmaceutical dispersions. In addition, our viscometer is suitable for determining with great accuracy the flow characteristics of both low and high viscosity fluids, whether Newtonian or non-Newtonian in character, through a wire range of shearing rates.

The apparatus of the instant invention comprises broadly a vertical torsion member or filament of suitable material maintained under tension by having its upper and lower ends attached by suitable means to a base member, a rotatable annular container for the liquid whose flow properties are to be studied substantially concentric with the torsion member, and a ring depending in the annular container substantially concentric with and rigidly attached to the torsion member at a point between its ends. When a couple is transmitted to the ring through the liquid in the container by rotation of the container, the ring and torsion member are deflected to that point at which the couple exerted on the torsion member equals the restoring couple due to the rigidity of the torsion member or filament. The measured quantities obtainable with our viscometer are revolutions of the annular container or cup per unit time, for example, revolutions per second, and angular deflection of the torsion member, generally measured in degrees and fractions of degrees, which measured quantities are readily converted into rate of shear, D seconds$^{-1}$ and shearing stress, S dynes/cm.$^2$, respectively, by well-known methods. From the calculated values of shearing stress and rate of shear, flow curves indicating the flow characteristics of the test fluid can be constructed, and its viscosity can be determined.

The invention is described in greater detail by reference to the following drawings, in which:

Figure 1 is a perspective view of the torsion member, ring and annular container, and means for measuring angular deflection of the torsion member, Figure 2 is a side elevational view, partly in section, of a preferred embodiment of the viscometer, and Figure 3 is a perspective view with parts cut away of another embodiment of the ring and cup.

Referring to Figures 1 and 2, 10 represents a torsion member which takes the form of a taut, substantially vertical filament attached to a base member (Figure 2) by upper and lower pin vises or chucks 11 and 12, respectively. A ring assembly indicated in general at 13 and comprising pin vice 14, spokes 15 and ring 16, is rigidly attached to and maintained substantially concentric with torsion member 10 by pin vise 14. Ring 16 depends (Figures 2 and 3) in annular container 17 which is in substantially concentric and spaced relation with torsion member 10, and ring 16.

In Figures 1 and 2, the ring takes the form of a hollow substantially vertical cylinder which depends in a cup having substantially vertical cylindrical sides. However, the ring and cup can have other configurations, one example of which is illustrated in Figure 3. In this figure, a V-shaped ring 18 is shown depending in a V-shaped annular cup 19. Ring 18 need not have the solid construction illustrated by the drawing, but can be hollow, being formed by two relatively thin sheets of suitable material joined at their lower edge so that they form an angle, which is preferably an acute angle.

The size of the ring and cup will depend upon the size of the instrument, the particular torsion member used, and the sensitivity required. The diameter of each peripheral surface of the ring will, of course, have a length intermediate the length of the diameters of the peripheral walls of the container. The diameter of the ring should be of such size as to provide a torque arm sufficient to cause a readable deflection of the particular torsion member with which it is employed. The peripheral surfaces of the ring should be relatively large as compared to its lower end surface. For example, in Figures 1 and 2, the interior and exterior peripheral or cylindrical surfaces of ring 16 are indicated as being many times greater than the surface of its lower end. Since rate of shear is inversely proportional to the distance between adjacent surfaces of the ring and cup, the sensitivity of the instrument can be advantageously varied by the use of cups of various sizes, for example, cups whose concentric sides are either relatively closely spaced or widely spaced apart.

Our instrument as thus far described, embodies a number of advantageous features. The instrument is highly sensitive for the torsion member is maintained in substantially frictionless suspension. Since the ring assembly can be of light weight construction and need not exceed 20 grams in weight, the torsion member can be a slender filament which will be deflected to a substantial degree even at very low rates of shear. The use of a light weight ring also insures substantially equal tension through the entire length of the torsion member. The high sensitivity of our instrument is also attributable to the use of a single filament of considerable length with a ring which is a large torque arm. Our viscometer has great versatility, for by use of cups of different dimensions and torsion members of different torsion constants, flow curves can be obtained for a wide variety of viscous systems. Our viscometer also has a distinct advantage over rotational viscometers having a cylinder or bob suspended by a torsion wire. Such viscometers produce inaccurate data because of the large surface area across the bottom of the bob. These inaccuracies or "end effects" are considered to be of the "first order" in magnitude since they are due to a major dimension of the bob. The end effects of our instrument are, however, substantially negligible or of the "second order" in magnitude for they result from but a very minor dimension of the ring, i. e. the relatively small surface area of the bottom of the ring. Any end effects of our rings can be substantially overcome by decreasing the distance between the peripheral surfaces of the ring and the side walls of the cup.

There are several factors which affect the accuracy of our instrument. These factors relate in general to the alignment of the ring and cup. For both Newtonian and non-Newtonian fluids, the ring and cup should be substantially concentric, and each peripheral surface of the ring should be parallel to the adjacent inner peripheral surface of the cup. Expressed in different terms, each peripheral surface of the ring should be concentric with the adjacent inner peripheral surface of the cup throughout the entire extent of the respective members. In addition to this relationship between ring and cup which is clearly indicated in each of the figures, the mean diameter of the peripheral surfaces of the ring should be substantially equal to one-half the sum of the diameters of the inner peripheral surfaces of the cup in order to obtain exact shear rate data for non-Newtonian fluids. In the case of the V-shaped cup of Figure 3, and other cups whose sides are not vertical, the mean diameter of the ring should be substantially equal to one-half the sum of the average diameters of the inner peripheral surfaces of the cup. Slight misalignment or eccentricity between cup and ring generally produce negligible inaccuracies.

Referring again to Figures 1 and 2, torsion member 10 is provided with means for indicating angular deflection of the torsion member which takes the form of a pointer 20 extending radially outward from and rigidly attached to the torsion member adjacent the ring assembly. Pointer 20 is readable on target 21. Other suitable means for indicating angular deflection include a plurality of mirrors attached to the torsion member, which mirrors reflect a beam of light on to a suitable target.

It was found that consistent and accurate values of shearing stress through a wider range of values are obtained from our instrument if deflection of the torsion member is measured with the cup and ring in substantially the same relative position each time a measurement is made. This is accomplished by having one end of the torsion member rotatably attached to the base member. Referring to Figure 1, upper pin vise 11 can be rotatably attached to the base member; however, it is prevented from rotating when the torsion member is subjected to a couple by suitable means, as for example by equipping the pin vise with a worm gear which engages a worm. The pin vise and worm gear are joined in such manner that they rotate as a unit about the same vertical axis, i. e., the axis of the torsion member. Thus, the pin vise is rotatable only by operation of the worm. Attached to the pin vise 11 is an indicator 22 bearing a vernier scale which is readable on indicia around the periphery of disc 23. Thus, when pointer 20 is deflected from its zero resting position by a couple applied to ring assembly 13, upper pin vise 11 is then rotated in a direction opposite to the direction of deflection until pointer 20 is returned to zero deflection. The degree of rotation of pin vise 11 is indicated from the position of indicator 22 with respect to disc 23. In other words, all measurements of deflection are made with pointer 20 and the ring at the same relative position or zero deflection. Of course, deflection can be measured by means of pointer 20, in which instance it may be advantageous to have each end of the torsion member fixedly attached to the base member.

Suitable torsion members include among others, stainless steel and bronze music wire, recorder wire, MacMichael viscometer wire, and monofilaments of nylon and quartz.

Figure 2 represents a preferred form of the apparatus of this invention in which a base member, indicated in general at A, comprises a stand 24, vertical supporting post 25, and vertically-slideable upper and lower tables 26 and 27, respectively. Stand 24 is provided with leg 28 and two adjustable screw jacks 29 for maintaining post 25 in a substantially vertical position. Tables 26 and 27 carry pinions 30, operated by knobs 31, which pinions engage with the teeth of rack 32 on post 25. Knobs 33 operate screw clamps which lock the upper and lower tables to post 25 at any desired position.

Upper pin vise 11 is rotatably attached to upper table 26 and is capable of rotation by means of the worm and worm gear arrangement discussed in reference to Figure 1. Rotatable with upper pin vise 11 is a tension gauge 34 having dial face 35 and clamp 36. Upper pin vise 11 is provided with an indicator (Figure 1) which is readable on indicia on disc 23.

Torsion member or filament 10 is held in taut suspension by tension gauge clamp 36 and upper and lower pin vises 11 and 12. Tension on the torsion member can be adjusted by means of tension screw 37 which engages lower pin vise 12. Ring assembly 13 is rigidly attached to torsion member 10 in the manner disclosed with reference to Figure 1, and is caused to depend in cup 17 by raising lower table 27 to the required position. Since it is usually desirable to conduct several tests under the same operating conditions, our instrument is provided with a depth gauge 38 mounted on post 25. Extension 39 on table 27 engages plunger 40 of gauge 38 as the ring enters the cup and ring depth is indicated from the gauge. By means of this gauge, the depth to which ring 16 enters container 17 may be made substantially constant for a series of runs. Pointer 20 is rigidly attached to torsion member 10 adjacent ring assembly 13, and is readable on target 21. This target is preferably adjustable to permit better alignment between pointer 20 and the zero mark of the target when the torsion member is at rest.

Mounted on lower table 27 is constant temperature bath 41 which is provided with a thermoregulator of sufficient sensitivity to at least control temperature to within ±0.05° C. of a selected temperature within the range of about 0° to 50° C. Suitable thermoregulators for this purpose include mercury and de Khotinsky types depending on precision demanded. Temperature of the bath may be indicated by any suitable means, such as a mercury in glass thermometer graduated in 0.05° C. units. Within bath 41 is hollow rotatable shaft 42 having annular container 17 attached to its upper end. Attached to the underside of table 27 are means (not shown) for rotating shaft 42 at a substantially constant selected speed. Such means can take the form of a constant speed electric motor connected to a suitable gear mechanism or a variable speed electric motor. Rate of rotation of the annular container is measured by suitable means such as a tachometer.

Operation of the above-described preferred form of our apparatus is as follows. A torsion member, such as a wire is attached to clamp 36 of tension gauge 34 and then threaded through upper pin vise 11, pointer 20, ring assembly 13, annular container 17 and shaft 42, and is finally clamped in the lower pin vise 12. Upper pin vise 11 is clamped to the torsion member with pointer 22 (Figure 1) at the zero mark on dial 23; the ring is carefully positioned concentric with respect to the container, and the final zero adjustment is made by moving target 21 in line with the pointer 20.

The ring immersion is adjusted to a reproducible value by means of the depth indicator, and the cup is filled with the liquid or dispersion whose properties are to be studied, and is rotated at a rate which is read on a tachometer. The cup may be rotated at a substantially constant selected speed or at an increasing rate of speed. A couple is transmitted through the fluid to the ring which is thereby caused to rotate until the couple exerted on the wire equals the restoring couple due to the rigidity of the wire. The tangential force acting on the ring is measured from the angle through which the upper pin vise and attached indicator must be turned to bring the pointer back to the zero mark. Values for shearing stress and rate of shear are calculated as previously indicated.

We claim:

1. An apparatus for ascertaining the flow characteristics of liquids and the like comprising a substantially vertical torsion member having one end fixedly attached and the other end rotatably attached to a base member and means for rotating the rotatably attached end about the axis of the torsion member, a rotatable annular container for the liquid substantially concentric with the torsion member, a ring depending in the container substantially concentric with and rigidly attached to the torsion member, each peripheral surface of the ring being substantially parallel to the adjacent inner peripheral surface of the container, the mean diameter of the peripheral surfaces of the ring being substantially equal to one-half the sum of the diameters of the inner peripheral surfaces of the container, a pointer extending radially outward from the torsion member and rigidly attached thereto adjacent the ring and a target upon which the pointer is readable, means for rotating the annular container at a substantially constant selected speed, means for maintaining the liquid in the container at a substantially constant selected temperature, means for indicating the depth to which the ring depends in the container, and means for indicating longitudinal tension on the torsion member.

2. The apparatus of claim 1 in which the ring is a hollow substantially vertical cylinder and the container has substantially vertical cylindrical walls.

3. The apparatus of claim 1 in which the ring and annular container are V-shaped.

4. An apparatus for ascertaining the flow characteristics of liquids and the like comprising a torsion member, a base member having upper and lower means for engaging each end of said torsion member to maintain said torsion member in taut vertical suspension, a rotatable annular container for the liquid substantially concentric with the torsion member, a ring depending in the container substantially concentric with and rigidly attached to the torsion member, each peripheral surface of the ring being substantially parallel to the adjacent inner peripheral surface of the container, the mean diameter of the peripheral surfaces of the ring being substantially equal to one-half the sum of the diameters of the inner peripheral surfaces of the container, means for indicating angular deflection of the torsion member, means for rotating the annular container at a substantially constant selected speed, and means for maintaining the liquid in said container at a substantially constant selected temperature.

References Cited in the file of this patent

UNITED STATES PATENTS

| 1,334,856 | Hayes et al. | Mar. 23, 1920 |
| 2,074,174 | Goodier | Mar. 16, 1937 |

FOREIGN PATENTS

| 684,935 | Great Britain | Dec. 24, 1952 |

OTHER REFERENCES

Publication, The Petroleum Engineer (Bednarski), October 1948, pp. 192, 194, 196, 198, 201, 202, and 204.